(12) United States Patent
Yoshida

(10) Patent No.: US 7,173,725 B2
(45) Date of Patent: Feb. 6, 2007

(54) ELECTRONIC APPARATUS FOR FACSIMILE COMMUNICATION, CONTROL METHOD AND CONTROL PROGRAM THEREFOR

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 994 days.

(21) Appl. No.: 10/052,339

(22) Filed: Jan. 23, 2002

(65) Prior Publication Data

US 2002/0114019 A1    Aug. 22, 2002

(30) Foreign Application Priority Data

Jan. 25, 2001   (JP)   ............... 2001-016472

(51) Int. Cl.
*G06F 15/00*   (2006.01)
(52) U.S. Cl. ............ 358/1.15; 358/402; 358/405; 358/407; 358/443
(58) Field of Classification Search ........... 358/400, 358/1.15, 403, 405, 407, 443, 402
See application file for complete search history.

(56) References Cited

U.S. PATENT DOCUMENTS

| | | | |
|---|---|---|---|
| 5,289,290 A * | 2/1994 | Suzuki et al. | 358/440 |
| 5,408,340 A * | 4/1995 | Edamura | 358/468 |
| 5,889,594 A * | 3/1999 | Maekawa | 358/296 |
| 6,275,308 B1 * | 8/2001 | Yoshida | 358/450 |
| 6,285,466 B1 * | 9/2001 | Chimura et al. | 358/434 |
| 6,407,827 B1 * | 6/2002 | Yoshida | 358/404 |
| 6,433,892 B1 * | 8/2002 | Yoshida | 358/296 |

FOREIGN PATENT DOCUMENTS

| | | |
|---|---|---|
| JP | 06-217047 A | 8/1994 |
| JP | 08-18755 | 1/1996 |
| JP | 09-093375 A | 4/1997 |
| JP | 09-252386 | 9/1997 |
| JP | 11-027434 A | 1/1999 |
| JP | 11027434 * | 1/1999 |
| JP | 11-177730 | 7/1999 |
| JP | 11-177735 | 7/1999 |
| JP | 2000-156764 | 6/2000 |
| JP | 2000-358118 | 12/2000 |

* cited by examiner

*Primary Examiner*—David Moore
*Assistant Examiner*—Michael Burleson
(74) *Attorney, Agent, or Firm*—Fitzpatrick, Cella, Harper & Scinto

(57) ABSTRACT

Collective transmission of image data for a same destination, containing one-side and two-side originals in mixed manner is enabled without deteriorating the interchangeability of a facsimile communication.

A one-touch dial memory is rendered capable of storing timer transmission data, and, when the memory transmission is designated by a one-touch key of an operation unit, two-side and one-side images are read and are stored in an image memory. When the image data of plural sets are to be transmitted to the same destination at a designated time, such image data of plural sets are collectively transmitted to the same destination by separately connecting the calling between the set of the two-side images and that of the one-side images.

12 Claims, 13 Drawing Sheets

FIG. 2

| BIT NO. | DIS/DTC | DCS |
|---|---|---|
| X | PRESENCE/ABSENCE OF BOTH-SIDE RECORDING FUNCTION (ALTERNATE MODE) | BOTH-SIDE TRANSMISSION (ALTERNATE MODE) |
| X+1 | PRESENCE/ABSENCE OF BOTH-SIDE RECORDING FUNCTION (CONTINUOUS MODE) | BOTH-SIDE TRANSMISSION (CONTINUOUS MODE) |

FIG. 3

| FLAG | ADDRESS | CONTROL | FCF | PC | BC | FC | LENGTH | PAGE NUMBER | PAGE INFORMATION | FCS | FLAG |

PC, BC, FC: ONLY IN ECM

FIG. 8

| ONE-TOUCH DIAL | ADDRESS | TIMER TRANSMISSION |
|---|---|---|
| 01 | 03-3111-1111 | 22:00 |

ELECTRONIC APPARATUS FOR FACSIMILE COMMUNICATION, CONTROL METHOD AND CONTROL PROGRAM THEREFOR

BACKGROUND OF THE INVENTION

1. Field of the Invention

The present invention relates to an electronic apparatus provided with facsimile transmission means for facsimile transmission of two-side image data, and a control method and a control program therefor.

2. Related Background Art

The conventional facsimile apparatus is basically designed on an operation of transmitting an original bearing information on one side thereof and recording such information on one side of a sheet. Also the conventional ITU-T Recommendation T4 or T30 describes such one-side communication only.

On the other hand, with recently increasing attention toward resource saving, so-called two-side recording mode for recording on both a front side and a reverse side of the recording sheet is increasingly provided in a printer, a copying machine, etc. Also the standard for the two-side facsimile communication was recommended by the ITU-T in February 2000. This is the ITU-T Recommendation T.30 which defines informing the presence or absence of a receiving function for the two-side information from a receiver to a transmitter and informing whether the communication is in the two-side mode from the transmitter to the receiver.

Also for transmitting the two-side image information, there are known two-side alternate transmission (alternate mode) of transmitting an image on the front side of an original and that on the reverse side alternately for each page, and two-side continuous transmission (continuous mode) of transmitting all the images on the front sides of the originals and then transmitting all the images on the reverse sides.

On the other hand, in a facsimile apparatus executing the conventional one-side communication, there is known an apparatus capable of so-called collective transmission.

In such collective transmission, in case plural image data to be transmitted to a same address are present in a transmission image memory on account of various reasons, for example, the postponement of the transmission owing to the destination being busy at the timer transmission or at the previous calling, the image data to the same address are collectively transmitted in one call connection.

Such collective transmission is effective in reducing the communication charge and is therefore preferably utilizable also in the facsimile apparatus capable of two-side communication, but such collective communication is not considered in the present Recommendation for two-side communication.

For example, since the aforementioned Recommendation T.30 assumes that all the original images to be transmitted in one two-side communication are two-side images, a machine constituted simply based on such Recommendation cannot achieve the collective communication in case a one-side original and a two-side original are mixedly present for the same address. On the other hand, a configuration simply designed to execute collective communication by an independent procedure may hinder interchangeability with a facsimile apparatus made by another manufacturer.

SUMMARY OF THE INVENTION

An object of the present invention is to enable collective transmission of image data for a same address, mixedly containing one-side original and two-side original, without deteriorating interchangeability of a facsimile apparatus.

The above-mentioned object can be attained, according to the present invention, in an electronic apparatus provided with facsimile transmission means capable of facsimile transmission of two-side image data or a control method or a control program therefor, by such configuration that in case of continuous collective transmission of image data of plural sets mixedly containing set(s) of two-side image data and set(s) of one-side image data for a same partner station, there is collectively transmitted the image data of plural sets to the same partner station by once disconnecting and then re-connecting the communication line between the transmission of the set(s) of the two-side image data and that of the set(s) of the one-side image data, and, in case the two-side image data or the one-side image data is plural sets of image data, there is collectively transmitted the plural sets of image data to the aforementioned same partner station without disconnecting the communication line.

BRIEF DESCRIPTION OF THE DRAWINGS

FIG. 2 is a chart showing FIF of DIS/DTC signal and DCS signal employed in the two-side transmission;

FIG. 3 is a view showing the format of a post message signal employed in the two-side transmission;

FIG. 8 is a view showing the content of a one touch dial memory shown in FIG. 1.

DESCRIPTION OF THE PREFERRED EMBODIMENTS

Figure 1:
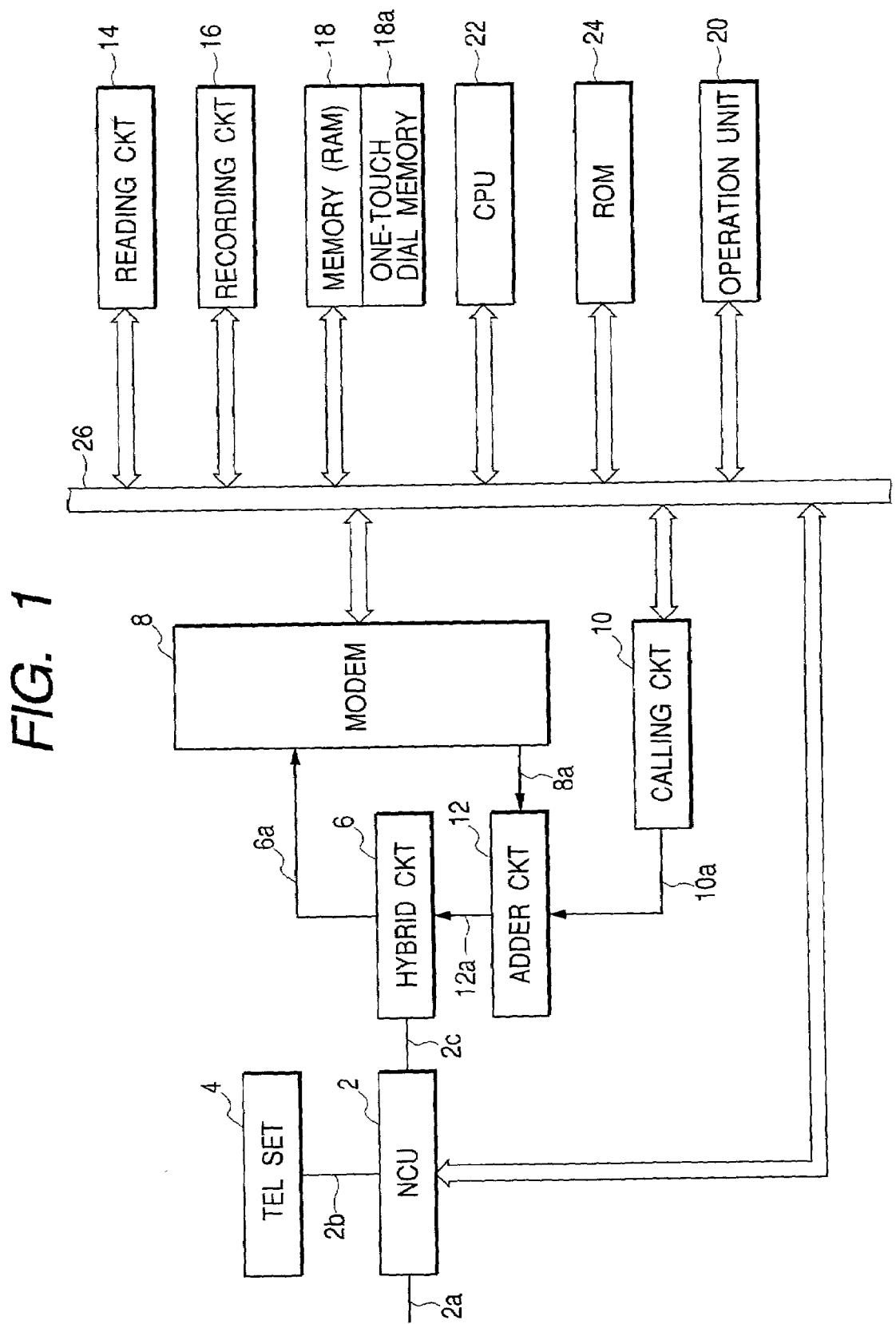
FIG. 1 is a block diagram showing the hardware configuration of a facsimile apparatus embodying the present invention.

FIG. 1 shows the hardware configuration of a facsimile apparatus embodying the present invention. Referring to FIG. 1, an NCU (network control unit) 2 is connected to a terminal of a communication line for utilizing a telephone network for data communication, etc., which executes connection control of the telephone exchange network, switching to a data communication line, holding a loop, etc. The NCU 2 connects a telephone line 2*a* to a telephone set 4 (CML off state) or to a facsimile apparatus (CML on state) according to the control from a bus 26. In the normal state, the telephone line 2*a* is connected to the telephone set 4.

A hybrid circuit 6 separates transmission signals and reception signals, and sends out a transmission signal from an adding circuit 12 to the telephone line 2*a* through the NCU 2 and receives a signal from a partner station through the NCU 2 to send the signal to a modem 8 through a signal line 6*a*.

The modem 8 executes modulation and demodulation based on the ITU-T Recommendations V.8, V.21, V.27ter, V.29, V.17 and V.34, and each transmission mode is designated under the control by the bus 26. The modem 8 receives the transmission signal from the bus 26 to output modulated data to a signal line 8*a*, and receives the reception signal from the signal line 6*a* to output demodulated data to the bus 26.

A call circuit 10 receives telephone number information under the control by the bus 26, and outputs a selection signal of DTMF format to a signal line 10*a*.

The addition circuit 12 receives the information on the signal line 10*a* and that on the signal line 8*a* and outputs the result of addition to a signal line 12*a*.

A reading circuit 14 is capable of reading two-side information, and image data read from an original are outputted to the bus 26. In the present embodiment, the reading circuit 14 may be constructed arbitrarily, such as a configuration of reading the two sides of an original at a time, a configuration of reading the front sides of the originals and then, after inversion of the originals by a user, reading the reverse sides of the originals, or a configuration of reading the front side of an original, the reverse side thereof, then the front side of a next original and so on utilizing, for example, an automatic inverting mechanism. In short, there can be employed any configuration capable of reading operation required for reading the images on both sides of the originals and suitably storing the result of reading in the memory.

A recording circuit 16 capable of recording two-side information records the information outputted on the bus 26, in succession, for each line. In the present embodiment, the recording circuit 16 is composed of a recording mechanism such as a laser beam printer provided with a recording sheet inverting mechanism. The recording sheet inverting mechanism of the recording circuit 16 is so constructed as to accommodate and invert plural recording sheets (two sheets in the following example, but such number can be selected arbitrarily) at a time.

A memory circuit 18 includes a read-and-write memory area (RAM) required for communication control, or a re-writable memory area backed up with a secondary battery or the like.

The memory circuit 18 of the present embodiment includes, as such re-writable memory area, at least a one-touch dial memory 18*a*.

The one-touch dial memory 18*a* stores destination information (telephone number) in correlation with one of one-touch dial keys of an operation unit 20 to be explained later in relation to FIG. 8 (one-touch dial key (01) in case of FIG. 8). Thus, by actuating one of the one-touch dial keys, a destination of the transmission information is determined utilizing such destination information.

In the present embodiment, the one-touch dial memory 18*a* is further provided with an area for registering a timer transmission time, in order to execute a time designated transmission. By suitably operating a keyboard of the operation unit 20, there can be designate the transmission time of a (suitably entered) original image to the aforementioned destination.

FIG. 8 shows the memory area for one destination only in the one-touch dial memory 18*a*, but in fact the memory area in the one-touch dial memory 18*a* is assigned corresponding to the number of the one-touch dial keys.

In the foregoing there has been explained a configuration in which the one-touch dial operation, destination and transmission time are mutually correlated, but the one-touch dial memory 18*a* may naturally be so constructed as to correlate a contracted dialing operation with numeral keys, destination and transmission time.

An operation unit 20 is provided with the aforementioned one-touch dial keys, contracted dialing keys, numeral keys, a * key, a # key, a start key, a stop key, a set key, a two-side transmission selecting key, and other function keys, and the information of a depressed key is outputted to the bus 26. The operation unit 20 is also provided with a display unit composed of display elements such as LCD or LED and receives and displays the information outputted on the bus 26.

A CPU (central processing unit) 22 controls the function of the entire facsimile apparatus and executes a facsimile transmission control procedure, according to a control program stored in a ROM 24. In the present embodiment, it is assumed that the CPU 22 executes encoding and decoding of the transmitted/received image data, but such encoding/decoding process may also be executed by a hardware encoder/decoder.

The bus 26 of the CPU 22 is composed of an address bus and a data bus.

In the following the general communication procedure for two-side transmission will be briefly explained with reference to FIGS. 2 to 7.

For two-side transmission, there are prepared two communication modes, that is, an alternate mode (two-side alternate transmission mode) and a continuous mode (two-side continuous transmission mode). In the former, front side and reverse side of every original are transmitted alternately, namely the front side of page 1 and the reverse side of page 1, the front side of page 2, the reverse side of page 2 and so on. In the latter, at first all the front sides of the originals are transmitted in the order of pages, namely the front side of page 1, the front side of page 2 and so on, and then all the reverse sides of the originals are transmitted in the order of pages, namely the reverse side of page 1, the reverse side of page 2 and so on. The facsimile apparatus can utilize either mode according to its configuration.

FIG. 2 is a table showing the configuration of information for designating the two-side transmission in FIF (facsimile information field) of DIS (digital identification signal: to be transmitted from the image receiving station), DTC (digital transmission command: to be transmitted from the image transmitting station) and DCS (digital command signal: to be transmitted from the image transmitting station).

As shown in FIG. 2, in the DIS/DTC signals, an x-th bit (in fact 113th bit) in FIF indicates the presence or absence of two-side recording function in the alternate mode, and (x+1)-th bit (in fact 114th bit) in FIF indicates the presence or absence of two-side recording function in the continuous mode. Also in the DCS signal, an x-th bit (113th bit) designates the two-side transmission in the alternate mode, and an (x+1)-th bit (114th bit) designates the two-side transmission in the continuous mode.

In the following description, the aforementioned bits designating the two-side recording function and the two-side communication mode will be represented as bit x and bit (x+1).

FIG. 3 shows the frame configuration of a Q signal in the normal G3 transmission (more specifically EOP (end of page) signal, MPS (multi page) signal or EOM (end of message) signal), or a PPS-Q signal in the ECM (error correction mode) transmission (more specifically a post message signal such as PPS-EOP, PPS-MPS, PPS-EOM or PPS-NULL).

In such post message signals, as shown in FIG. 3, facsimile information is transmitted after a flag, an address, a control (control data) and a FCF (facsimile control field). At the head of the facsimile information, there are transmitted, only in case of ECM, three fields consisting of PC (page counter), BC (block counter) and FC (frame counter), followed by facsimile information relating to the two-side transmission. The facsimile information relating to the two-side transmission starts with a length (indicating the data size (in the unit of an octet) of the corresponding page; this field having a data width of an octet), a page number (two octets) and a page information, followed by an FCS (frame check sequence) and a flag.

Among the above-mentioned data, the page number is to be increased by one, starting from p1, for transmission of each of the front and reverse sides the two-side originals are transmitted in units of page. The page information has a data width of 1 octet and indicates whether the image information is on the front side or reverse side, representing the front side (0) or reverse side (1) by bit 0. Also bit 1 to bit 6 are reserved bits with undefined functions and bit 7 is an expansion bit normally set at 0.

Of the facsimile information in the above-mentioned post message signals, three fields, that is, length, page number and page information are newly added for the purpose of two-side transmission.

The PC, BC and FC signals are not contained in the Q signal used in the normal G3 communication, but used only in the PPS-Q signal used in the ECM communication.

Figure 4:
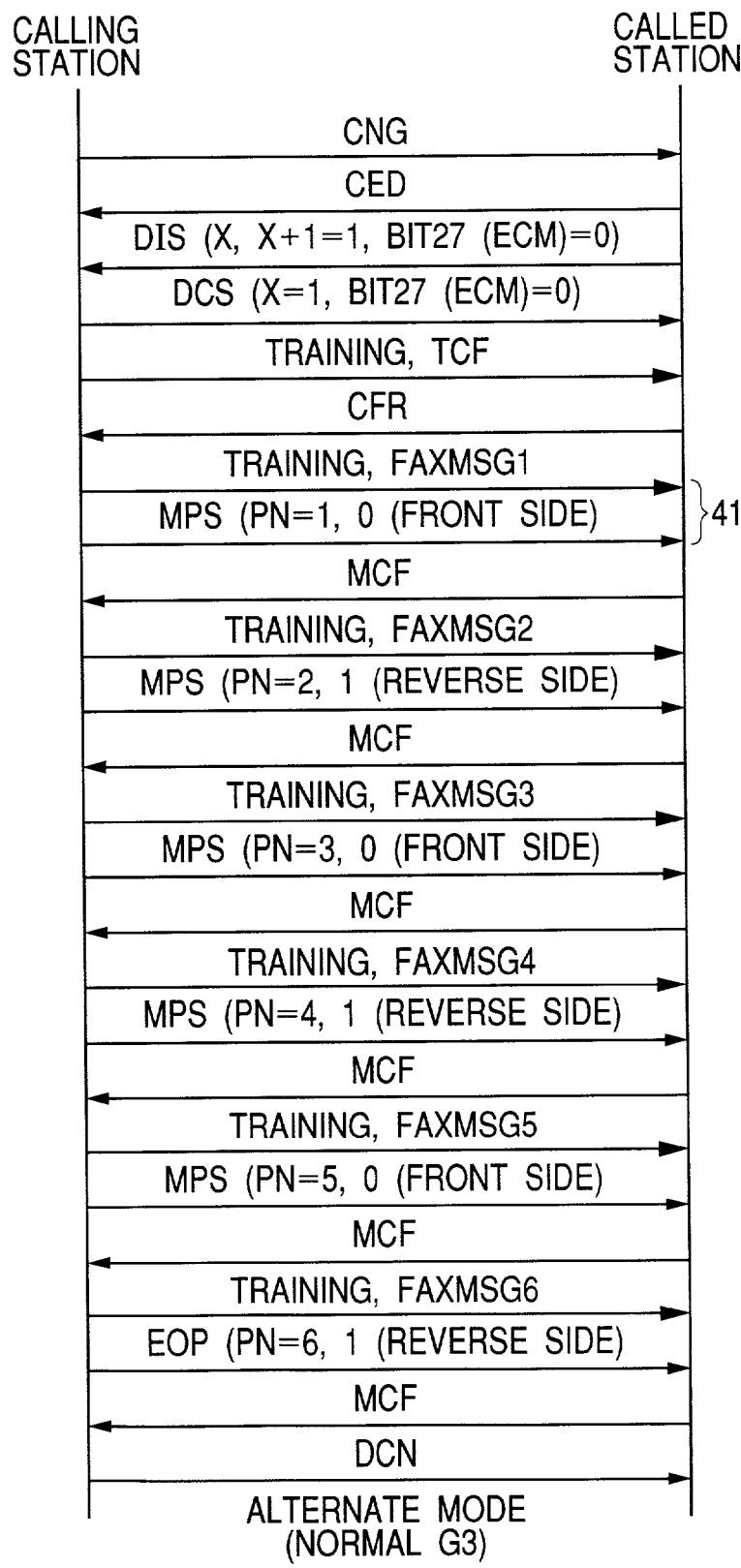
FIG. 4 is a view showing the procedure of two-side transmission in an alternate mode in a non-ECM communication mode.
Figure 5:
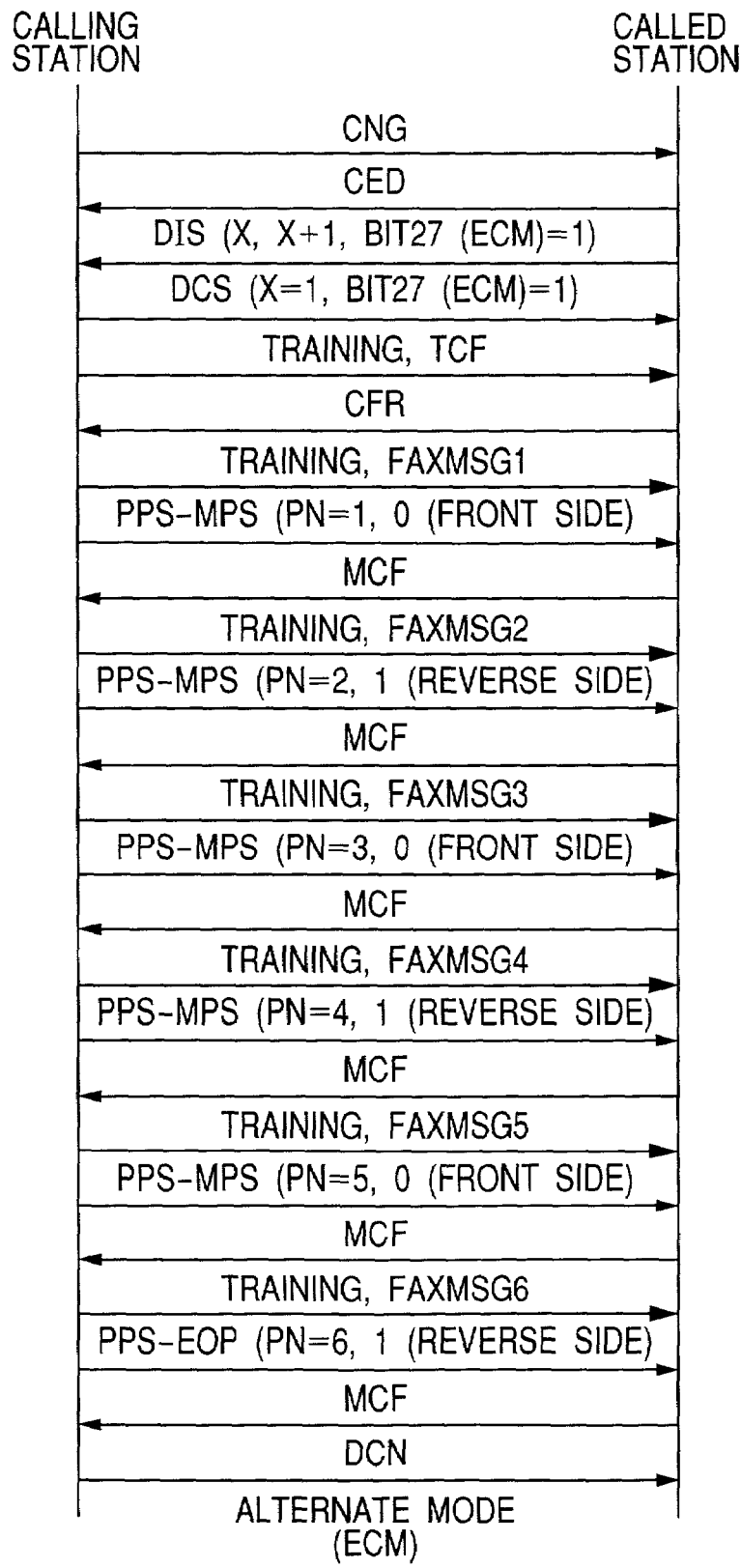
FIG. 5 is a view showing the procedure of two-side transmission in an alternate mode in an ECM communication mode.
Figure 6:
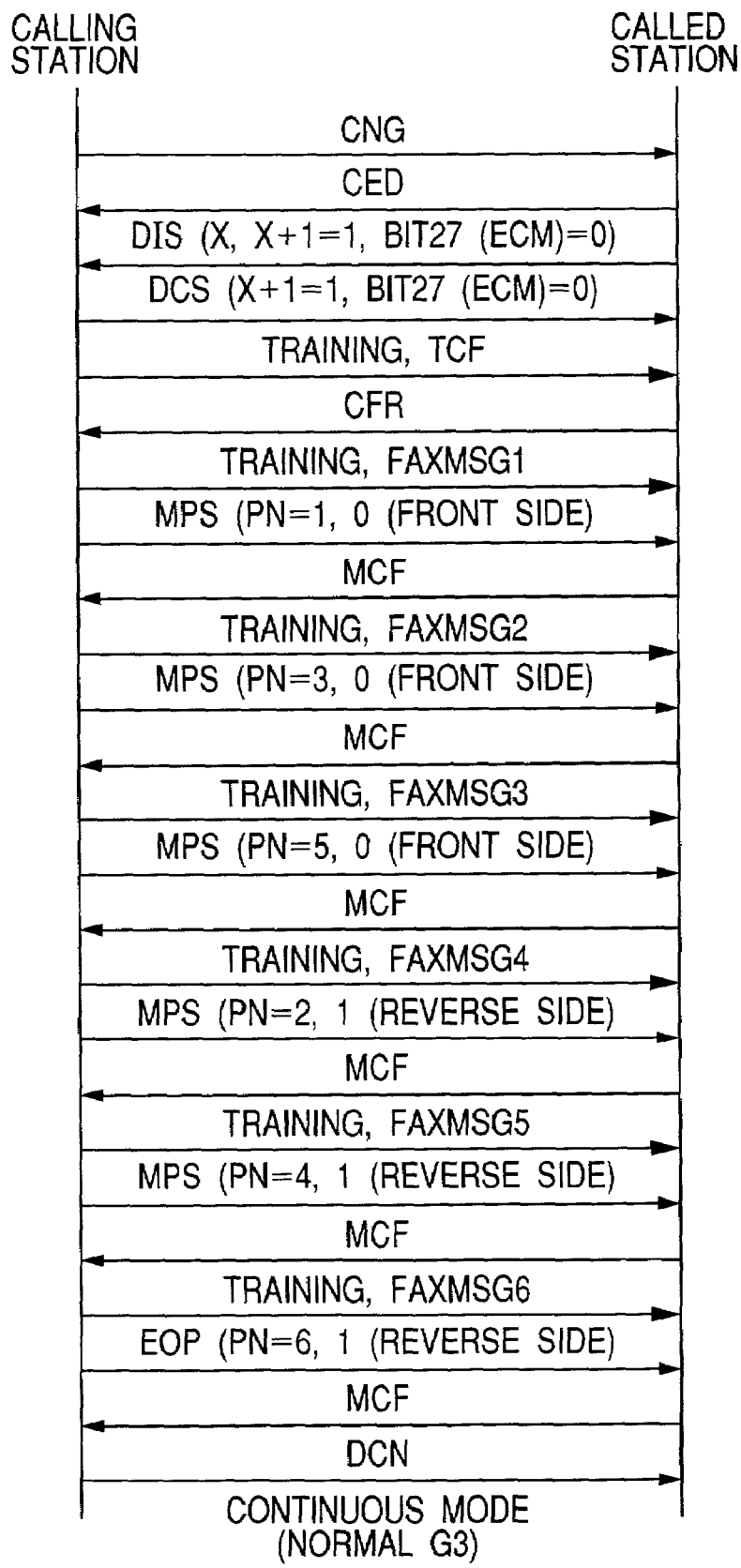
FIG. 6 is a view showing the procedure of two-side transmission in a continuous mode in the non-ECM communication mode.

FIG. 4 shows the mode of two-side transmission in the alternate mode in the normal G3 mode; FIG. 5 shows the mode of two-side transmission in the alternate mode in the ECM communication mode; FIG. 6 shows the mode of two-side transmission in the continuous mode in the normal G3 mode; and FIG. 7 shows the mode of two-side transmission in the continuous mode in the ECM communication mode.

As shown in FIGS. 4 to 7, bit x and bit x+1 in the DIS signal indicate the two-side transmitting function (both in the alternate and continuous modes) at the receiving station, and bit x and bit x+1 in the DCS signal declare the two-side transmitting mode to be executed at the transmitting station. In the continuous mode shown in FIGS. 6 and 7, bit (x+1) of the DCS signal is set at "1" thereby declaring that the transmission is to be made in the continuous mode.

Figure 7:
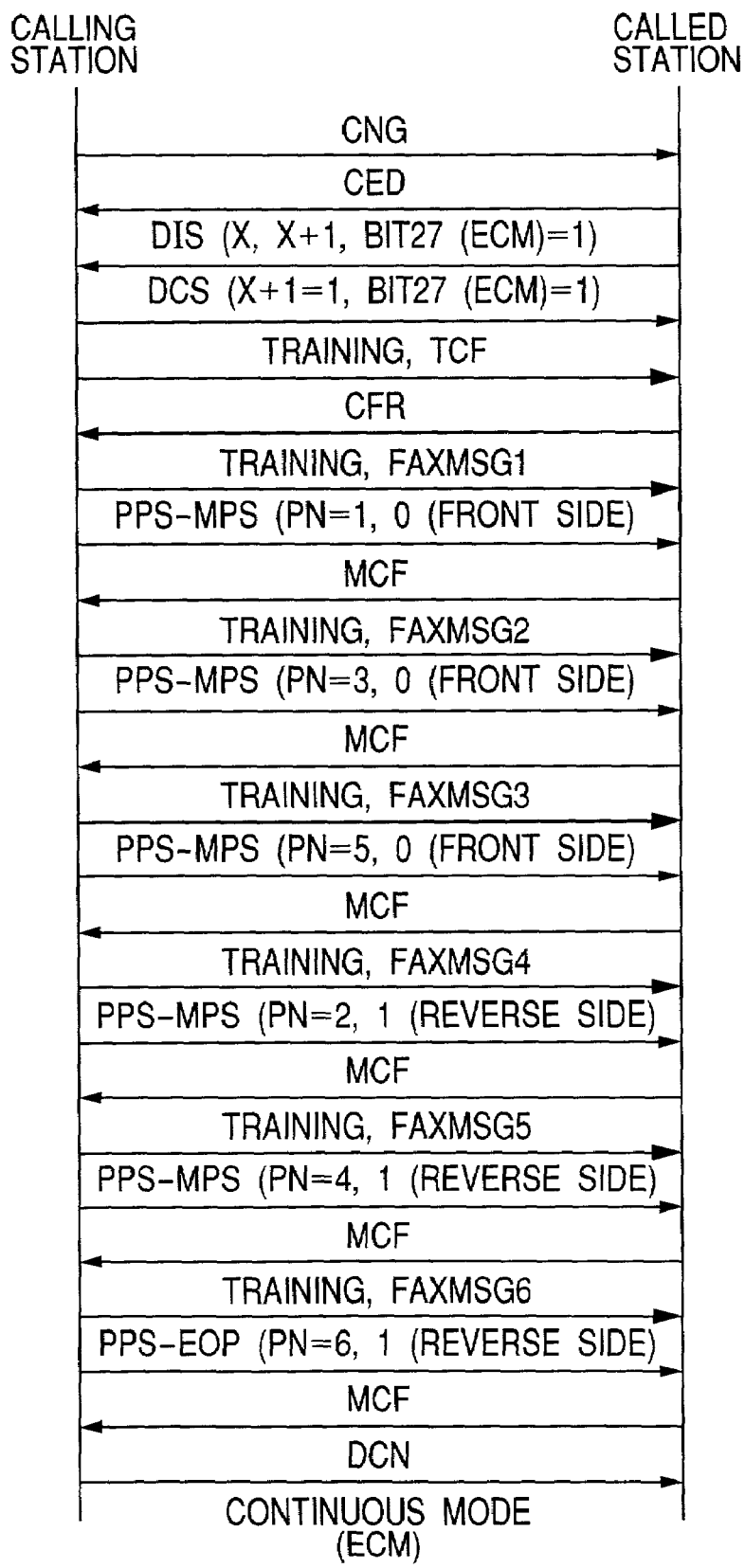
FIG. 7 is a view showing the procedure of two-side transmission in a continuous mode in the ECM communication mode.

Also in case of the normal mode the MPS signal is employed as the post message signal as shown in FIG. 4 and 6, and, in case of the ECM communication the PPS-MPS signal is employed as the post message signal as shown in FIGS. 5 and 7.

In these drawings there is shown a case of transmitting three sheets of two-side originals, and "PN" in these drawings indicates page number explained in the foregoing.

For example, the MPS signal 41 in FIG. 4 (alternate mode) is represented as "MPS (PN=1, 0 (front side)", indicating that image information of the front side (0 (front side)) is transmitted as page number 1 (PN=1). The MPS or PPS-MPS signal in FIG. 4 and thereafter is represented in a similar manner.

More specifically, in the alternate mode shown in FIGS. 4 and 5, the image information of the originals are transmitted in the order of front side (0) of the first sheet (PN=1), reverse side (1) of the first sheet (PN=2), front side (0) of the second sheet (PN=3), reverse side (1) of the second sheet (PB=4), front side (0) of the third sheet (PN =5) and reverse side (1) of the third sheet (PN=6).

Also in the continuous mode shown in FIGS. 6 and 7, the image information of the originals are transmitted in the order of front side (0) of the first sheet (PN=1), front side (0) of the second sheet (PN=3), front side (0) of the third sheet (PN=5), reverse side (1) of the first sheet (PB=2), reverse side (1) of the second sheet (PN=4) and reverse side (1) of the third sheet (PN=6).

In the foregoing there has been explained the general two-side receiving procedure, but, in the present embodiment, the CPU 22 executes the following communication control according to a control program stored in the ROM 24.

Also in the present embodiment, in case image data for a same address (same partner station) are stored in the memory by, for example, time designated transmission, the transmission to the address is executed by collective communication which means communication with a same partner in continuous manner regardless whether the call connection is executed in one time or in plural times (hereinafter used in the same meaning).

In the present embodiment, the two-side original and the one-side original for a same destination are transmitted by "collective communication" in continuous manner, but the call connection is made separately between the two-side original and the one-side original.

Also in the present embodiment, there is checked whether the partner station is capable of executing the two-side communication based on the ITU-T Recommendation T.30, and the two-side original and the one-side original are transmitted by connecting calls separately and utilizing the two-side communication mode based on the Recommendation T.30.

Also in case the partner station is incapable of executing the two-side communication based on the ITU-T Recommendation T.30, all the originals can be transmitted as one-side originals in one call connection, utilizing the one-side protocol.

Also in the present embodiment, whether or not the two-side communication protocol based on the ITUT Recommendation T.30 is used, the collective transmission is so controlled as to conserve the front and reverse attributes of the two-side original images of plural sets (read separately by the reading circuit 14). For example, a set of two-side original images lacks the last reverse side, the "collective transmission" in the present embodiment does not transmit the image of the front side of the next set of original images at such lacking position, but transmits all-white (entirely null or blank) information, in order not to change the relationship of the front and reverse sides of the two-side original images. Such transmission method prevents causing confusion in the user at the receiving side.

FIGS. 9 to 14 are flow charts showing the process flow for realizing the above-described communication control, wherein the same numbers indicate that the process flow is continued at such numbers, respectively. The control procedures shown in these drawings are stored in the ROM 24 as a program for the CPU 22.

Figure 9:
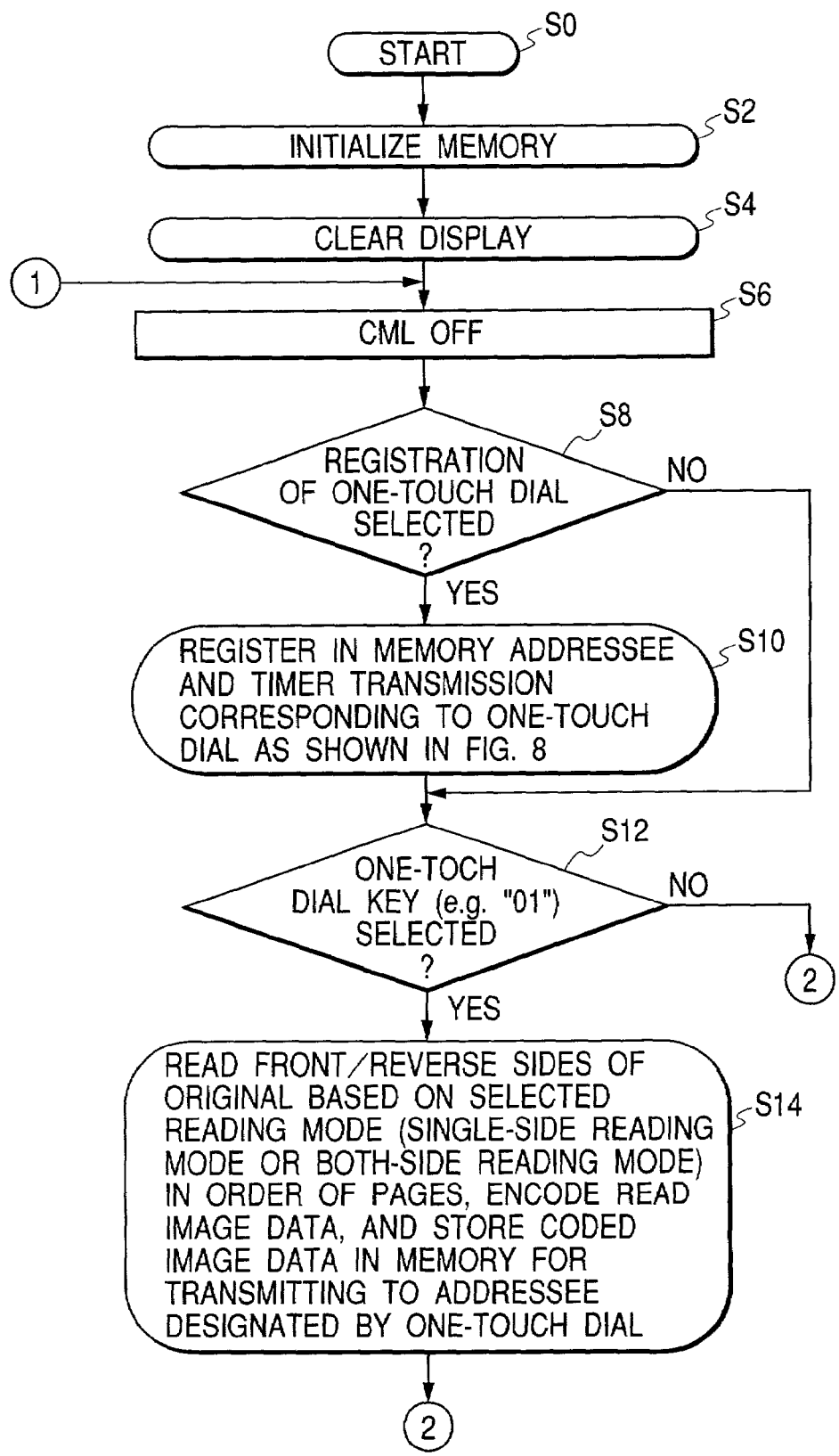
FIG. 9 is a flow chart showing the communication control of the CPU 22 shown in FIG. 1.
Figure 10:
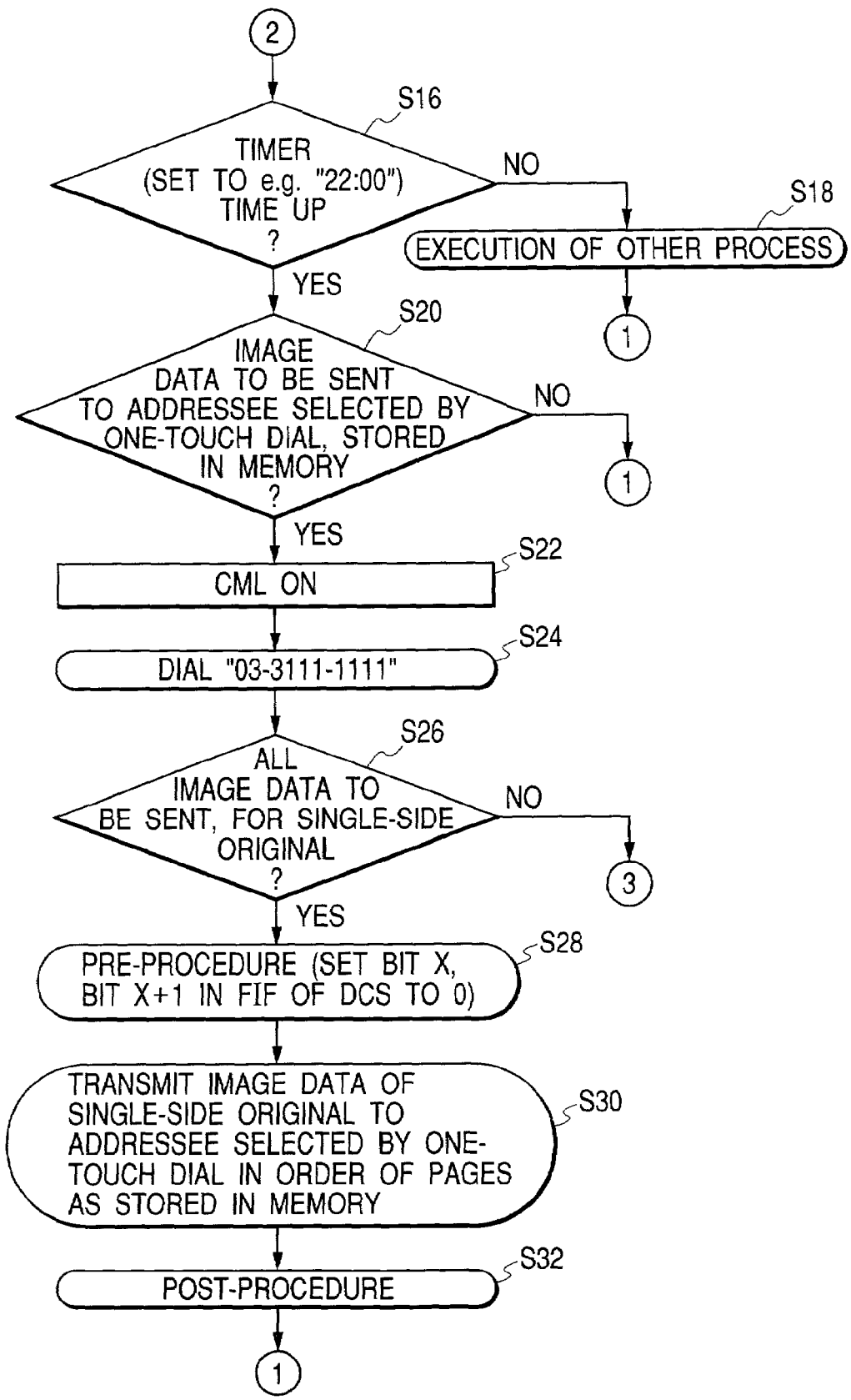
FIG. 10 is a flow chart showing the communication control of the CPU 22 shown in FIG. 1.

Referring to FIG. 9, a step S0 indicates the start of the process, to be started by predetermined resetting operations.

A step S2 initializes the memory circuit 18 through the bus 26, and a step S4 initializes (clears) the display unit of the operation unit 20 through the bus 26.

A step S6 turns off the CML of the NCU 2 through the bus 26, thereby connecting the line 2*a* to the telephone set 4.

Steps S8 (FIG. 9) to S24 (FIG. 10) indicate the flow of an example of the operations for the purpose of simplicity and are different from the actual flow in the program. These flow charts do not indicate that the operations and the communication control have to be executed in the illustrated order. The persons skilled in the art can naturally construct the program of the CPU 22 so as to achieve equivalent operations and communication control. More specifically, the steps S8 (FIG. 9) to S24 (FIG. 10) indicate the process for only one one-touch key (01), but the programming for executing similar process for other one-touch keys will be quite obvious for those skilled in the art.

The step S8 read the operation information of the operation unit 20 through the bus 26, and discriminates whether a user has executed a one-touch dial registering operation. If such operation has been executed, a step S10 registers registration data as shown in FIG. 8 in the memory circuit 18, based on a suitable registering operation system.

A time "22:00" shown in FIG. 8 indicates the time of transmission to the partner station, and such time designation may mean only one transmission or a transmission at this time every day. Also the meaning of such time designation may be made selectable by a suitable setting operation. In any case, in the present embodiment, in response to the actuation of the one-touch dial key (01), the two-side/one-side image is read and stored in the image memory of the memory circuit 18. The communication is not executed until the first designated time 22:00 is reached.

A step S12 discriminates whether the one-touch dial key (01) of the operation unit 20 has been actuated. If operated, a step S14 is executed, but, if not, the sequence proceeds to a step S16 shown in FIG. 10.

The step S14 causes the reading circuit 14 to read original images of one set (a series of original image data conventionally transmitted in one communication/one call)) and to store them in the image memory of the memory circuit 18. In this operation, the user can select either of the two-side/one-side reading modes by the operation unit 20 and such reading mode is assumed to be stored in a management data area of the memory circuit 18.

The step S16 (FIG. 10) discriminates whether the aforementioned designated time "22:00" has been reached. Such time discrimination is executed by using a count result of a timer IC (not shown). If the designated time 22:00 has not been reached, a step S18 executes other processes (a copying process for the original, a process for other memory registration, etc.) and the sequence returns to the step S6. In the foregoing, for the purpose of simplicity, it has been described to discriminate whether the designated time 22:00 has been reached, but the actual programming scans the registration data of all the one-touch dial keys by, for example, timer interruption, thereby checking whether the set times for respective registration data have been reached.

When the step S16 confirms that the designated time 22:00 corresponding to the registration data shown in FIG. 8 has been reached, the sequence proceeds to a step S20.

As the memory circuit 18 may store plural sets of the image data read in the past, the step S20 discriminates whether the image data to a corresponding destination to the selected one-touch key (01) are stored in the memory circuit 18. If not stored, the sequence returns to the step S6, but, if stored, a step S22 turns on CML of the NCU 2 thereby connecting the line 2*a* to the facsimile apparatus.

The step S24 calls, based on the registration data shown in FIG. 8, a corresponding telephone number (3111-1111).

A step S26 discriminates whether the set of the image data to be transmitted to the aforementioned destination is all composed of one-side originals. If so, the sequence proceeds to the step S26, but, if not, the sequence proceeds to a step S34 (FIG. 11).

A step S28 executes a facsimile communication pre-procedure, but, since one-side communication suffices in this case, bit x and bit x+1 of DCS are set at 0 to declare the one-side communication to a receiving station. Then a step S30 executes collective transmission of one set or plural sets of the image data stored in the memory circuit 18, by the one-side procedure for each page in the order of storage. Since all the images are transmitted by the one-side procedure, there is not required control on the front/reverse side of the original. The step S28 utilizes the one-side procedure only and does not rely on the two-side communication protocol based on the ITU-T Recommendation T.30. Then a step S32 executes a facsimile communication post-procedure, whereupon the sequence returns to the step S6.

Figure 11:
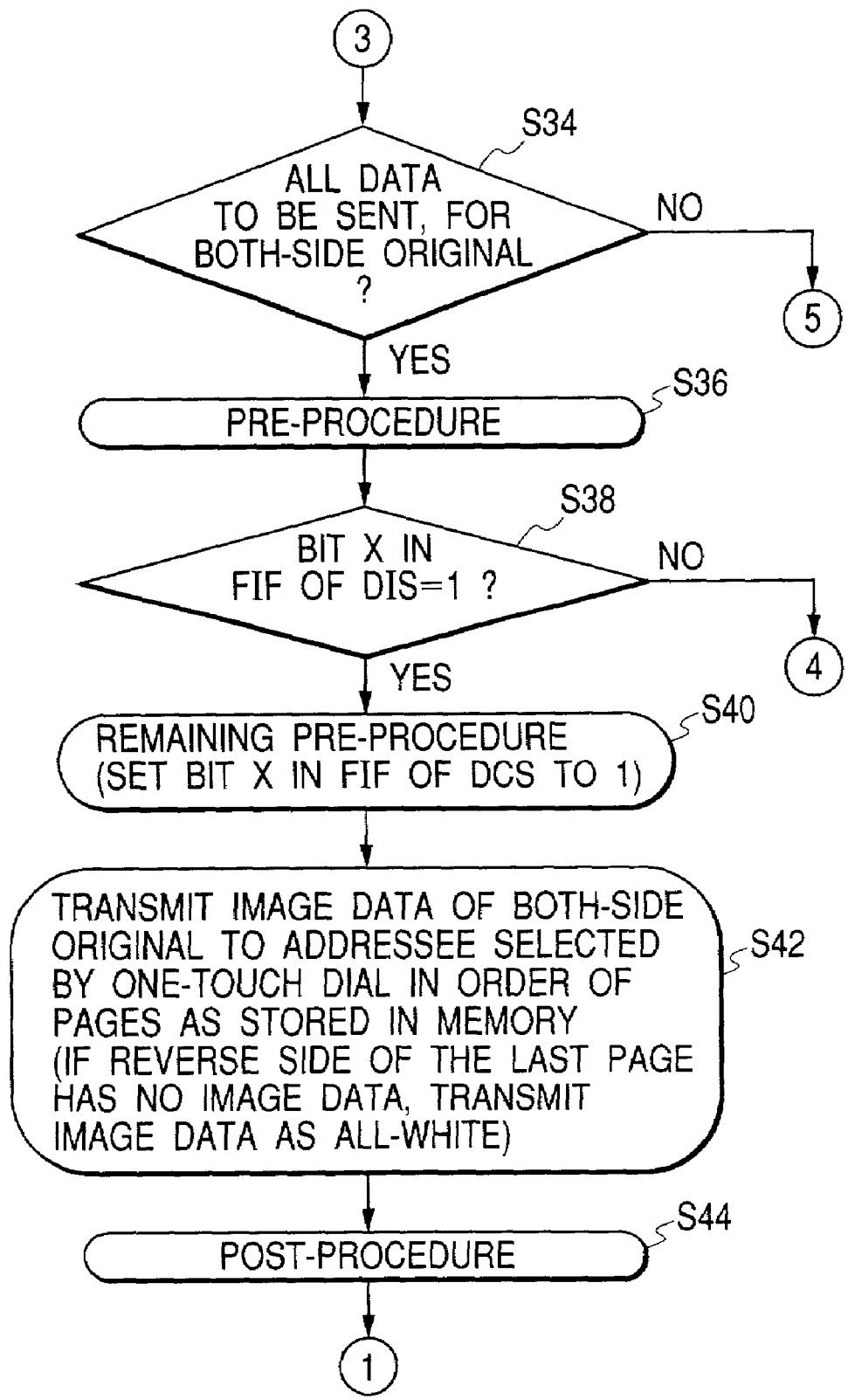
FIG. 11 is a flow chart showing the communication control of the CPU 22 shown in FIG. 1.
Figure 12:
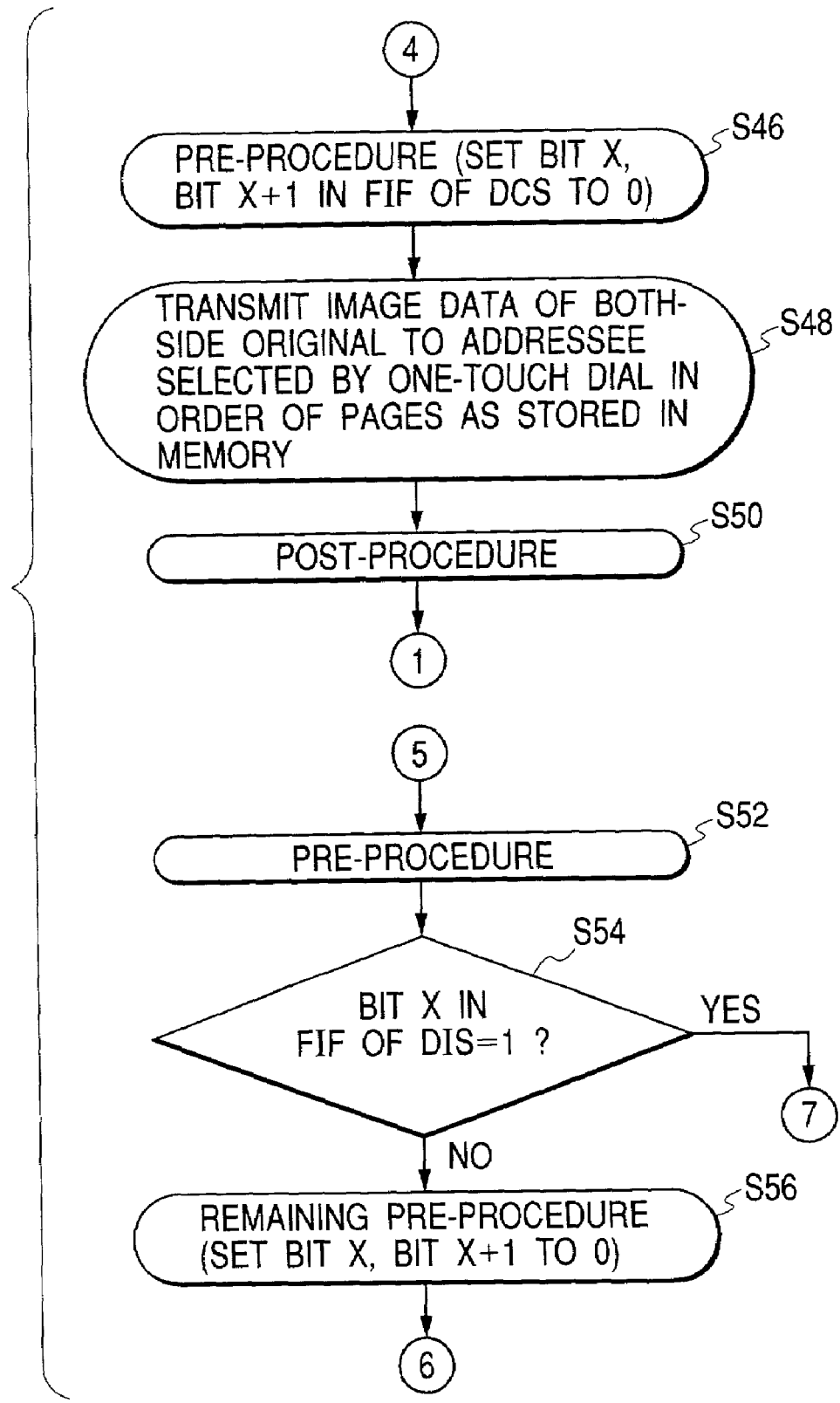
FIG. 12 is a flow chart showing the communication control of the CPU 22 shown in FIG. 1.

On the other hand, in case the step S26 identifies that the set of the image data to be transmitted to the aforementioned destination is not all composed of the one-side originals, a step S34 in FIG. 11 discriminates whether the set of the image data to be transmitted to the aforementioned destination is all composed of two-side originals, and, if so, the sequence proceeds to a step S36, but, if not, the sequence proceeds to a step S52 in FIG. 12.

In case the set of the image data to be transmitted to the aforementioned destination is all composed of two-side originals, the step S36 executes a facsimile communication pre-procedure, and a step S38 discriminates whether bit x of FIF in the DIS signal received from the partner station is 1, namely whether the receiving station supports (at least) the two-side reception in the alternate mode. If the receiving station supports (at least) the two-side reception in the alternate mode, the sequence proceeds to a step S40 to execute the remaining pre-procedure. The step S40 sets bit x of FIF of the DCS signal at 1, thereby declaring the two-side communication in the alternate mode, whereupon the sequence proceeds to a step S42. On the other hand, if the receiving station does not support the two-side reception, the sequence proceeds to a step S46 in FIG. 12.

The step S42 transmits the image data of one set or plural sets stored in the memory circuit 18 by the two-side procedure in succession in the order of storage. Since the step S34 already confirms that the set of the image data to be transmitted to the aforementioned destination is all composed of two-side originals, all the originals are collectively transmitted by the two-side communication protocol based on the ITU-T Recommendation T.30.

Also the step S42 controls the collective transmission in such a manner as to conserve the front/reverse attribute of the two-side original image. More specifically, all the two-side originals of plural sets are transmitted except the last reverse side, and, if no image is present in the last reverse side, all-white (all-blank or all-null) information is transmitted at the position of the last reverse side. In this manner the image of the front side of a next set is prevented from being recorded as the reverse side of the preceding set. After the two-side transmission of the images of all the sets, a step S44 executes a facsimile post-procedure, whereupon the sequence returns to the step S6.

The step S34 identifies that the set of the image data to be transmitted to the aforementioned destination is all composed of two-side originals. But, if the step S38 identifies that the partner station does not support the two-side reception, the step S46 in FIG. 12 sets bit x, bit x+1 of FIF of the DCS signal at 0 to declare the one-side transmission, whereupon the sequence proceeds to a step S48.

In this case the two-side images stored in the memory circuit 18 can only be transmitted by the one-side procedure, so that the step S48 executes, as in the step S30, collective transmission of the image data of one set or plural sets stored in the memory circuit 18 in succession by the one-side procedure for each page in the order of storage. Then a step S50 executes a facsimile communication post-procedure, whereupon the sequence returns to the step S6.

On the other hand, in case the step S34 identifies that the sets of the image data to be transmitted to the aforementioned destination are not all composed of two-side originals, there exist plural sets of originals including one-side and two-side originals in mixed manner. In such case, the sequence proceeds to the step S52 for executing a facsimile communication pre-procedure, and then a step S54 judges bit x of FIF of the DIS signal of the partner station, thereby discriminating whether the receiving station supports (at least) the two-side reception in the alternate mode. If the receiving station supports (at least) the two-side reception in the alternate mode, the sequence proceeds to a step S62 in FIG. 13, but, if the receiving station does not support the two-side reception, the sequence proceeds to a step S56.

Figure 13:
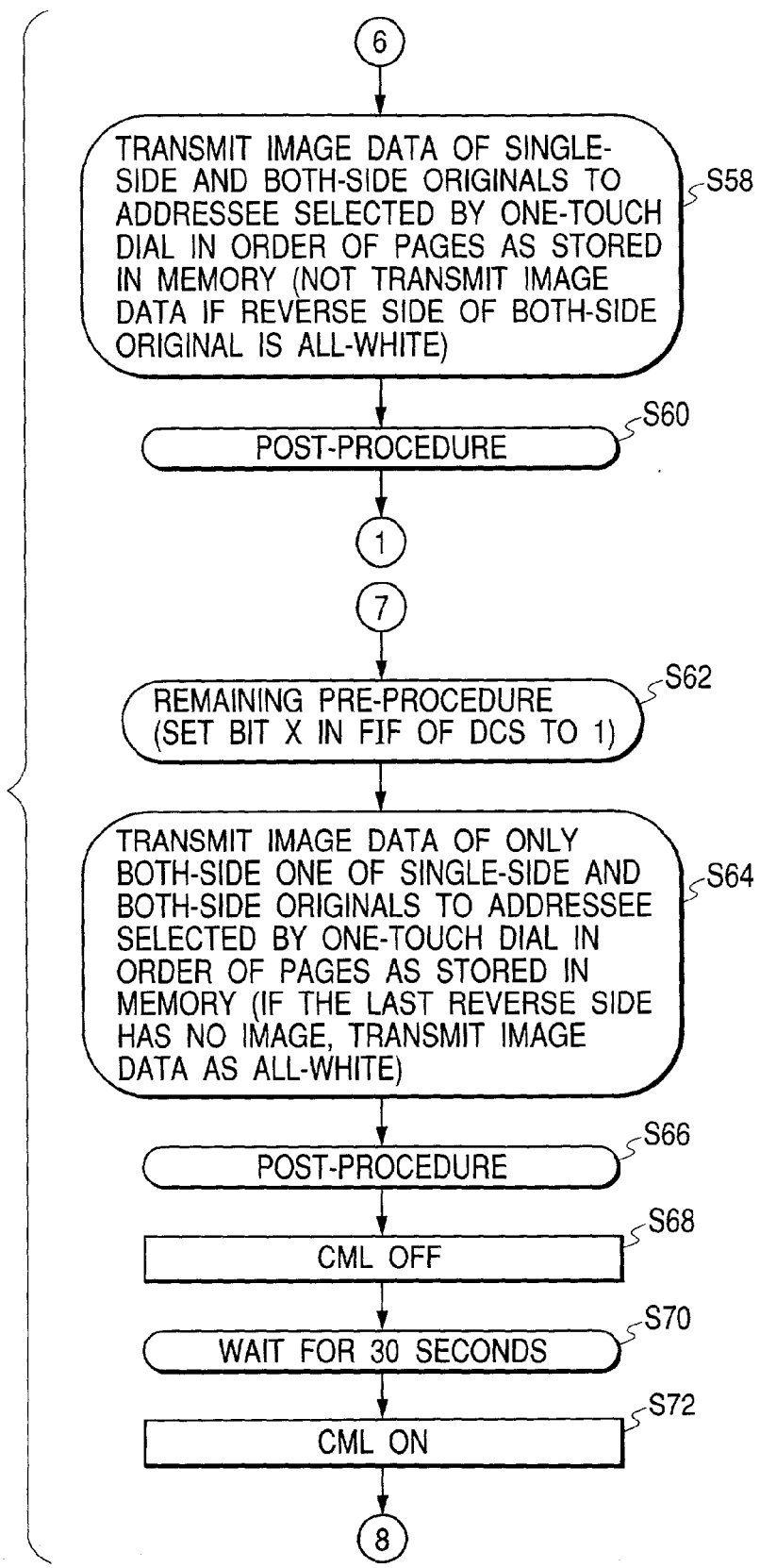
FIG. 13 is a flow chart showing the communication control of the CPU 22 shown in FIG. 1.
Figure 14:
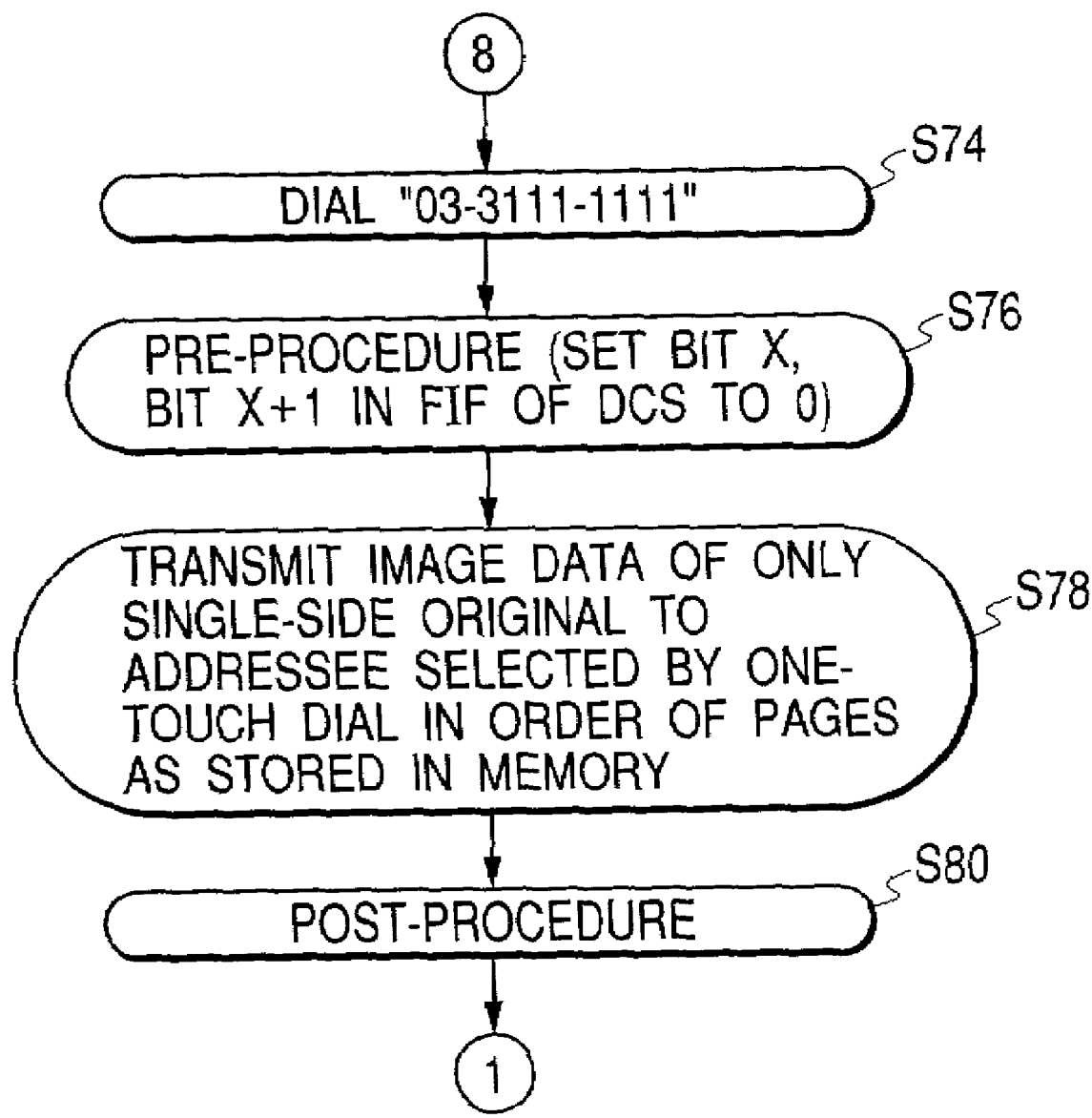
FIG. 14 is a flow chart showing the communication control of the CPU 22 shown in FIG. 1.

In case the receiving station does not support the two-side reception, the step S56 sets bit x and bit x+1 of FIF of the DCS signal to 0 thereby declaring the one-side transmission, whereupon the sequence proceeds to a step S58 in FIG. 13.

The step S58 in FIG. 13 executes, as in the step S30, collective transmission of the image data of plural sets, stored in the memory circuit 18 and including one-side and two-side originals, in succession by the one-side procedure for each page in the order of storage. In case the reverse side of a two-side original consists of all-blank image, such side is not transmitted (however, there may also be adopted a configuration in which such side is also transmitted or such transmission can be selected by the user). Then a step S60 executes the facsimile communication post-procedure, whereupon the sequence returns to the step S6.

On the other hand, in case the memory circuit 18 stores the image data of plural sets including one-side and two-side originals in mixed manner, and the receiving station supports (at least) the two-side reception in the alternate mode, a collective transmission is executed by separating the calls respectively between the two-side set and the one-side set. In such case, the step S62 sets bit x of FIF of the DCS signal to 1 to declare the two-side communication in the alternate mode, and the sequence proceeds to a step S64.

Steps S64 to S68 at first transmits, among the image data of plural sets stored in the memory circuit 18 and including the one-side and two-side originals, the two-side original images by the two-side procedure.

The step S64 transmits the image data of the two-side originals in the memory circuit 18 by the two-side procedure (alternate mode) in succession in the order of storage. In case the memory circuit 18 stores the image data of two-side originals of plural sets, such image data are transmitted in continuous manner through one call. In this operation, in case the last reverse side in each set contains no image to be transmitted, all-blank information is transmitted at such position in order that the data to be recorded on the front side are recorded on the front side of the recording sheet and that to be recorded on the reverse side are recorded on the reverse side of the recording sheet.

A step S66 executes a facsimile communication post-procedure, then a step S68 turns off the CML of the NCU 2 to once disconnect the call, and a step S70 waits for a suitable time period (30 seconds in the present embodiment).

Then a procedure starting from a step S72 transmits the remaining set of the one-side original images by the one-side procedure.

At first the step S72 turns on the CML of the NCU 2 thereby connecting the line 2a again to the facsimile apparatus. Then a step S74 in FIG. 14 calls the same partner station. (The illustrated telephone number merely shows an example of the registration data shown in FIG. 2.)

Then a step S76 executes the facsimile communication post-procedure. Since the one-side transmission is executed in this state, the step S76 sets bit x and bit x+1 of FIF of the DCS signal to 0 to declare the one-side transmission.

Then a step S78 transmits the remaining set of the one-side original image data by the one-side procedure in succession in the order of storage. Then a step S80 executes the facsimile communication post-procedure, whereupon the sequence returns to the step S6.

As explained in the foregoing, in case the receiving station supports (at least) the two-side reception in the alternate mode, the steps S62 to S80 can execute "collective transmission" for the plural sets of two-side original image data and one-side original image data respectively by the two-side procedure and by the one-side procedure, in continuous manner but through respectively separate calls.

The above-described embodiment enables collective transmission, as far as possible, for the sets of the two-side original image data and the one-side original image data stored in the memory, thereby significantly reducing the communication charge.

In particular, in the present embodiment, since the calls are separated between the set of the two-side originals and that of the one-side originals in case of utilizing the two-side procedure, it is possible to collectively transmit the set of two-side image and that of the one-side images without deteriorating the interchangeability. For example, in the present embodiment, in steps where the two-side procedure is to be employed (for example, in the steps S62 to S66), the two-side communication is executed based on the ITU-T Recommendation T.30, so that the image data containing the one-side and two-side originals in mixed manner can be collectively transmitted to a same destination, without deteriorating the interchangeability of the facsimile communication. Also the number of calls is two at maximum in the absence of error, so that the increase in the communication cost is minimal.

In the foregoing there has been explained an exclusive facsimile apparatus, but the present invention is naturally applicable also to other types of facsimile apparatuses. For example, the present invention may be realized in a configuration in which a fax modem is attached to or incorporated in a general-purpose terminal such as a personal computer and the facsimile communication is executed under the control of a software. In such case, the control program of the present invention may be stored in and supplied from not only the aforementioned ROM 24 but also any computer readable storage medium such as a hard disk, a floppy disk, an optical disk, a magnetooptical disk or a memory card.

As will be apparent from the foregoing description, in an electronic apparatus provided with facsimile transmission means capable of facsimile transmission of two-side image data a control method for the electronic apparatus or a control program for the same, in case of collective transmission in continuous manner for image data of plural sets, containing a set or sets of two-side image data and a set or sets of one-side image data in mixed manner, to a same partner station, such collective transmission of the image data of plural sets to the same partner station is executed by once disconnecting a communication line and then again connecting the line between the transmission for the set or sets of the two-side images and that for the set or sets of the one-side image data, but, in case the aforementioned two-side image data or the one-side image data are plural sets of image data, such plural sets are collectively transmitted by the aforementioned facsimile transmission means to the aforementioned partner station without disconnecting the communication line. Thus, there can be obtained an excellent effect that the sets of the two-side image data and one-side images can be collectively transmitted without deteriorating the interchangeability, as the sets are separated between the sets of the two-side images and those of the one-side images.

What is claimed is:

1. An electronic apparatus capable of facsimile transmission, which enables a facsimile transmission means to collectively transmit image data of plural sets stored in an image memory to be transmitted to a same partner station, without disconnecting a call, said apparatus comprising:
   control means adapted, in case two-side image data of a set or sets and one-side image data of a set or sets to be transmitted to the same partner station are stored in the image memory, to cause said facsimile transmission means to collectively transmit the image data of plural sets in such a manner that collective transmission of only the set(s) of two-side image data as stored in the image memory without disconnecting a call and collective transmission of only the set(s) of one-side image data as stored in the image memory without disconnecting a call are performed with separating respective calls from each other,
   wherein in case the collective transmission of only the set(s) of two-side image data as stored in the image memory without disconnecting a call and the collective transmission of only the set(s) of one-side image data as stored in the image memory without disconnecting a call are performed with separating respective calls from each other, said control means is adapted to once disconnect a first call, and then issue a second call.

2. An apparatus according to claim 1, wherein said control means uses a facsimile communication procedure based on the ITUT Recommendation in the collective transmission of the two-side image data of set(s) and the collective transmission of the one-side image data of set(s).

3. An apparatus according to claim 1, where in the collective transmission of the two-side image data of set(s), if the last reverse side to be transmitted does not contain image data, said control means causes said facsimile transmission means to transmit all blank information as the image data of the last reverse side.

4. An apparatus according to claim 1, wherein if it is identified that the partner station does not perform two-side reception, said control means causes said facsimile transmission means to collectively transmit the two-side image data of set(s) using one-side procedure.

5. A control method for an electronic apparatus capable of facsimile transmission, which enables a facsimile transmission step of collectively transmitting image data of plural sets stored in an image memory to be transmitted to a same partner station, stored in an image memory, without disconnecting a call, said method comprising:
   a control step adapted, in case two-side image data of a set or sets and one-side image data of a set or sets to be transmitted to the same partner station are stored in the image memory, to cause said facsimile transmission step to collectively transmit the image data of plural sets in such a manner that collective transmission of only the set(s) of two-side image data as stored in the image memory without disconnecting a call and collective transmission of only the set(s) of one-side image data as stored in the image memory without disconnecting a call are performed with separating respective calls from each other,
   wherein in case the collective transmission of only the set(s) of two-side image data as stored in the image memory without disconnecting a call and the collective transmission of only the set(s) of one-side image data as stored in the image memory without disconnecting a call are performed with separating respective calls from each other, said control step is adapted to once disconnect a first call, and then issue a second call.

6. A method according to claim 5, wherein said control step uses a facsimile communication procedure based on the ITUT Recommendation in the collective transmission of the two-side image data of set(s) and the collective transmission of the one-side image data of set(s).

7. A method according to claim 5, where in the collective transmission of the two-side image data of set(s), if the last reverse side to be transmitted does not contain image data, said control step causes said facsimile transmission step to transmit all blank information as the image data of the last reverse side.

8. A method according to claim 5, wherein if it is identified that the partner station does not perform two-side reception, said control step causes said facsimile transmission step to collectively transmit the two-side image data of set(s) using one-side procedure.

9. A computer readable storage medium storing a computer program for the implementation of a control method for an electronic apparatus capable of facsimile transmission, which enables a facsimile transmission step of collectively transmitting image data of plural sets stored in an image memory to be transmitted to a same partner station, without disconnecting a call, said method comprising:
   a control step adapted, in case two-side image data of a set or sets and one-side image data of a set or sets to be transmitted to the same partner station are stored in the image memory, to cause said facsimile transmission step to collectively transmit the image data of plural sets in such a manner that collective transmission of only the set(s) of two-side image data as stored in the image memory without disconnecting a call and collective transmission of only the set(s) of one-side image data as stored in the image memory without disconnecting a call are performed with separating respective calls from each other,
   wherein in case the collective transmission of only the set(s) of two-side image data as stored in the image memory without disconnecting a call and the collective transmission of only the set(s) of one-side image data as stored in the image memory without disconnecting a call are performed with separating respective calls from each other, said control step is adapted to once disconnect a first call, and then issue a second call.

10. A storage medium according to claim 9, wherein said control step uses a facsimile communication procedure based on the ITUT Recommendation in the collective transmission of the two-side image data of set(s) and the collective transmission of the one-side image data of set(s).

11. A storage medium according to claim 9, where in the collective transmission of the two-side image data of set(s), if the last reverse side to be transmitted does not contain image data, said control step causes said facsimile transmission step to transmit all blank information as the image data of the last reverse side.

12. A storage medium according to claim 9, wherein if it is identified that the partner station does not perform two-side reception, said control step causes said facsimile transmission step to collectively transmit the two-side image data of set(s) using one-side procedure.

* * * * *

UNITED STATES PATENT AND TRADEMARK OFFICE
CERTIFICATE OF CORRECTION

| | |
|---|---|
| PATENT NO. | : 7,173,725 B2 |
| APPLICATION NO. | : 10/052339 |
| DATED | : February 6, 2007 |
| INVENTOR(S) | : Takehiro Yoshida |

It is certified that error appears in the above-identified patent and that said Letters Patent is hereby corrected as shown below:

SHEET 8:

Figure 9, "ONE-TOCH" should read --ONE-TOUCH--.

COLUMN 1:

Line 44, "case" should read --a case wherein--; and
    Line 62, "case" should read --a case wherein--.

COLUMN 2:

Line 11, "case" should read --a case--;
    Line 19, "case" should read --a case wherein--; and
    Line 46, "one touch" should read --one-touch--.

COLUMN 3:

Line 64, "case" should read --the case--.

COLUMN 4:

Line 5, "designate" should read --designated--.

COLUMN 5:

Line 60, "case" should read --the case--; and
    Line 62, "case" should read --the case--.

COLUMN 6:

Line 26, "case" should read --a case wherein--;
    Line 46, "case" should read --a case wherein--; and
    Line 52, "ITUT" should read --ITU-T--.

COLUMN 7:

Line 23, "read" should read --reads--.

UNITED STATES PATENT AND TRADEMARK OFFICE
CERTIFICATE OF CORRECTION

| | |
|---|---|
| PATENT NO. | : 7,173,725 B2 |
| APPLICATION NO. | : 10/052339 |
| DATED | : February 6, 2007 |
| INVENTOR(S) | : Takehiro Yoshida |

It is certified that error appears in the above-identified patent and that said Letters Patent is hereby corrected as shown below:

COLUMN 8:

Line 29, "case" should read --a case wherein--; and
    Line 37, "case" should read --a case wherein--.

COLUMN 9:

Line 20, "case" should read --a case wherein--;
    Line 34, "case" should read --a case wherein--;
    Line 42, "case" should read --a case wherein--;
    Line 49, "case" should read --a case wherein--; and
    Line 65, "case" should read --a case wherein--.

COLUMN 10:

Line 1, "case" should read --a case wherein--;
    Line 29, "case" should read --a case wherein--;
    Line 44, "case" should read --a case--; and
    Line 46, "image" should read --images--.

COLUMN 11:

Line 8, "case" should read --a case--;
    Line 17, "case" should read --a case wherein--;
    Line 56, "ITUT" should read --ITU-T--; and
    Line 59, "where in" should read --wherein in--.

COLUMN 12:

Line 31, "ITUT" should read --ITU-T--; and
    Line 34, "where in" should read --wherein in--.

UNITED STATES PATENT AND TRADEMARK OFFICE
CERTIFICATE OF CORRECTION

PATENT NO.       : 7,173,725 B2
APPLICATION NO.  : 10/052339
DATED            : February 6, 2007
INVENTOR(S)      : Takehiro Yoshida It is certified that error appears in the above-identified patent and that said Letters Patent is hereby corrected as shown below:

<u>COLUMN 13</u>:

Line 7, "ITUT" should read --ITU-T--.

Signed and Sealed this

Twenty-seventh Day of November, 2007

JON W. DUDAS
*Director of the United States Patent and Trademark Office*